United States Patent [19]
Stancil

[11] Patent Number: 5,963,431
[45] Date of Patent: Oct. 5, 1999

[54] DESKTOP COMPUTER HAVING ENHANCED MOTHERBOARD/RISER CARD ASSEMBLY CONFIGURATION

[75] Inventor: Charles J. Stancil, Tomball, Tex.

[73] Assignee: Compaq Computer Corporation, Houston, Tex.

[21] Appl. No.: 09/060,063

[22] Filed: Apr. 14, 1998

[51] Int. Cl.[6] .............................. H05K 1/11; H01R 9/09
[52] U.S. Cl. ....................... 361/803; 361/788; 361/785; 361/796; 439/61
[58] Field of Search .................................. 361/683, 686, 361/756, 788, 784, 785, 796, 803; 439/61; 364/708.1; 395/280–284

[56] References Cited

U.S. PATENT DOCUMENTS

| | | | |
|---|---|---|---|
| 5,519,573 | 5/1996 | Cobb et al. ............................. | 361/686 |
| 5,604,871 | 2/1997 | Pecone .................................... | 395/291 |
| 5,717,575 | 2/1998 | Copeland et al. ................... | 631/756 X |
| 5,793,617 | 8/1998 | Dent ........................................ | 361/785 |

*Primary Examiner*—Leo P. Picard
*Assistant Examiner*—Jayprakash N. Gandhi
*Attorney, Agent, or Firm*—Konneker & Smith, P.C.

[57] ABSTRACT

A desktop computer system is provided in which a motherboard is mounted within a computer chassis atop a tray which is rearwardly slidable out of a rear wall opening in the chassis to provide access to the motherboard. I/O cables are coupled to I/O connectors mounted on a rear end edge of the motherboard, and a connector socket extending along a side edge portion of the motherboard removably receives a bottom side edge connector portion of a riser card which transversely projects upwardly from the motherboard. All cable connections from internal computer devices are made directly to the riser card instead of to the motherboard. Accordingly, all that is necessary to provide access to the motherboard is to upwardly unseat the riser card from the motherboard and then slide the motherboard, with the I/O cables still connected thereto, rearwardly out of the chassis on the tray. Using a single PHY host controller bus driver disposed on the riser card, the motherboard/riser card assembly economically provides support for multiple device bays within the computer.

32 Claims, 3 Drawing Sheets

DESKTOP COMPUTER HAVING ENHANCED MOTHERBOARD/RISER CARD ASSEMBLY CONFIGURATION

BACKGROUND OF THE INVENTION

1. Field of the Invention

The present invention generally relates to computer apparatus and, in a preferred embodiment thereof, more particularly relates to configurational aspects of the interconnected motherboard/riser card portion of a computer.

2. Description of Related Art

As conventionally constructed, a desktop personal computer has an external housing or chassis within which a main system circuit board (commonly referred to as the "motherboard") is operatively disposed. The motherboard is typically mounted adjacent and parallel to the bottom wall of the housing and has the computer's central processing unit (CPU) and other electronic components of the computer operatively positioned on the top side thereof. Transversely secured to the motherboard, and projecting upwardly therefrom, is a riser card—another printed circuit board having expansion slots thereon to which various expansion cards may be operatively coupled.

In order to facilitate the construction of computers by permitting their manufacturers to purchase interchangeable motherboard and riser card subassemblies from a variety of suppliers, two industry-standard form factors—the "LPX" standard and the "NLX" standard—have been at least unofficially adopted as to the configurational aspects of the necessary motherboard/riser card subassembly portion of the desktop computer. Despite the fabricational and multi-source purchasing benefits obtained by using these industry-standard form factors, each has proven to present certain well-known serviceability limitations.

When the LPX motherboard/riser card form factor is utilized, the riser board contains the PCI and ISA expansion slots, and a bottom connection edge portion of the riser card removably plugs into an elongated connector socket generally centrally disposed on the top side of the motherboard. The motherboard is disposed within the computer housing chassis and removably screwed to the bottom wall of the chassis. The necessary I/O cables (for the serial port, parallel port, keyboard, mouse, etc.) extend inwardly through the back side of the computer housing and are removably plugged into suitable connectors mounted on a rear edge portion of the motherboard. Cables from various internal components of the computer (for example, the power supply unit, IDE, floppy drive, speaker, etc.) are removably secured to suitable connectors on the top side of the motherboard.

In order to remove the motherboard for service or upgrade purposes it is necessary, when the LPX form factor is employed, to perform a rather tedious five step process—namely, (1) unplug the I/O cables from the rear edge of the motherboard (which often also include cables connected to various add-in cards); (2) vertically unseat the riser card from the motherboard; (3) unplug the internal component cables from the motherboard; (4) unscrew the motherboard from the chassis; and (5) lift the unscrewed motherboard upwardly out of the chassis. Of course, subsequently reinstalling the motherboard and riser card subassembly within the chassis requires counterparts to each of these five steps.

One previous attempt to modify and provide enhanced serviceability to the LPX form factor is illustrated and described in copending U.S. patent application Ser. No. 08/681,060 filed on Jul. 22, 1996, entitled "MODULAR DESKTOP COMPUTER HAVING ENHANCED SERVICEABILITY," and assigned to the same assignee as the present application. In such copending patent application, an LPX form factor motherboard and riser card assembly was illustrated as being modified by securing the motherboard to a tray structure which could be slid out the rear I/O connection side of the computer chassis, and by securing the riser card to an upwardly movable "cage" structure which facilitated the upward unplugging of the riser card from the motherboard. This modification to the LPX form factor eliminated the necessity of unplugging the I/O cables from the motherboard in order to remove it from the chassis, and eliminated the necessity of unscrewing the motherboard from the chassis before removing the motherboard.

From an overall serviceability standpoint, the NLX motherboard/riser card form factor represents an appreciable improvement over the unmodified LPX form factor. Specifically, when the NLX form factor standard is utilized, the internal component cables plug into the riser card instead of into the motherboard, and an elongated connector socket on a lower side edge portion of the riser card removably receives, in a horizontal direction, a corresponding connector side edge portion of the motherboard, the length of such connector side edge portion extending transversely to the rear motherboard edge upon which the I/O connectors are disposed. To remove the motherboard when the NLX form factor is used only three steps are required—namely, (1) unplug the I/O cables connected to the motherboard from the rear of the unit; (2) horizontally unseat the motherboard from the riser card; and (3) horizontally slide the unseated motherboard out the side of the chassis. Counterparts to these three steps must be later performed to reinstall the motherboard within the computer chassis.

Various well-known disadvantages and limitations are associated with each of these previously utilized motherboard/riser card form factors. For example, the LPX form factor (even as modified as shown in copending U.S. application Ser. No. 08/681,060) requires that the internal cables be unplugged from the motherboard before it can be removed from the chassis. The NLX form factor requires that the external I/O cables be unplugged from the motherboard before it can be removed from the chassis.

Furthermore, neither the LPX form factor (either in its standard configuration or its modified configuration discussed above) nor the NLX motherboard/riser card form factor is particularly well suited for use in a computer which incorporates more than one "device bay" therein. A device bay is basically an internal bay area within the computer chassis into which a modular computer device (such as a CD ROM drive, a hard drive or a floppy drive) may be operatively and removably inserted from the exterior of the computer. The insertable modular device typically has a connector on its back end which mates with a corresponding bay connector structure in response to insertion of the device into the bay, the bay structure connector structure, in turn, being cabled to the motherboard or the riser card depending upon which motherboard/riser card form factor is being utilized.

Each device bay requires a 1394 (an industry standard high speed serial bus) port and a USB (an industry standard medium speed serial bus) port—no daisy chaining or sharing of ports is allowed. Thus, a computer with two device bays requires two dedicated 1394 ports and two dedicated USB ports. Furthermore, each bay is connected to a Device Bay Controller (DBC) which communicates to the system, typically over a serial bus such as $I^2C$ (or SMBus) or USB.

In the most cost effective implementation of a multiple device bay system there is a single 1394 PHY device (a bus driver for the host controller), and a USB root hub that feed the bays. The LPX form factor is not a good choice for multiple device bays due to the additional cabling that would be required between the device bays and the motherboard. The NLX form factor, in which a single 1394 PHY and host controller are incorporated on the motherboard, has some built-in device bay interconnection capability. However, the NLX motherboard edge connector (the interface between the motherboard and riser card) only has support for a single 1394 port. Therefore, a two device bay system requires a secondary 1394 PHY to expand that single port to two (or more) ports. In that scenario, according to the Device Bay specification, a USB DBC must be used. Because of this requirement, the multi-device bay design incurs a substantial cost penalty due to the second PHY and a more complex (and therefore expensive) DBC.

As can be seen from the foregoing, both of the current LPX and NLX motherboard/riser card form factors have associated therewith a variety of problems and limitations relating both to serviceability and device bay support. It is to these problems and limitations that the present invention is directed.

SUMMARY OF THE INVENTION

In carrying out principles of the present invention, in accordance with a preferred embodiment thereof, a computer system is provided that includes a CPU unit to which a monitor and a keyboard are operatively connected. The CPU unit has a microprocessor, and a date storage device operative to store data that may be retrieved by the microprocessor.

According to a key aspect of the invention, the CPU unit, representatively a desktop computer, has a specially designed motherboard/riser card assembly disposed in a chassis portion thereof. Compared to conventional motherboard/riser card assemblies having industry standard LPX or NLX form factors, the motherboard/riser card assembly of the present invention provides substantially enhanced serviceability and device bay support capabilities.

The chassis has an outer side portion with an opening therein, and the motherboard is supported within the chassis, representatively on a sliding tray structure, for movement relative to the chassis into and out of its outer side portion opening. At least one I/O connector, to which an I/O cable external to the chassis may be secured, is carried on a first edge portion of the motherboard positioned adjacent the chassis outer side portion opening for movement outwardly therethrough.

A riser card connector socket is mounted on the motherboard, preferably on a second side edge portion thereof which extends transversely to the first side edge portion upon which each I/O connector is mounted. A riser card has a bottom connector edge portion which is downwardly and removably received in the connector socket to position the riser card transversely to the motherboard and electrically couple the riser card and motherboard. At least one cable connector, to which an internal computer component may be secured, is carried on the riser card.

Uniquely, the I/O and riser card cable connectors form, for apparatus external to the motherboard, the sole cable connections for the motherboard. Accordingly, the motherboard may be easily and quickly accessed for servicing and upgrading purposes, without having to first disconnect any cables therefrom, by simply uncoupling the riser card from its motherboard socket and then moving the motherboard outwardly through the outer chassis side portion opening.

In accordance with another aspect of the present invention in a preferred embodiment thereof, the motherboard/riser card assembly is constructed to economically support multiple device bays within the CPU unit chassis without the previous necessity of providing the assembly with a secondary 1394 PHY host controller bus driver and an associated USB device bay controller. To this end, a plurality of 1394 ports are mounted on the riser card and may be coupled to corresponding connector structures on a plurality of device bays disposed within the chassis. A 1394 host controller is mounted on the motherboard/riser card assembly, and a single host controller bus driver (PHY) is carried on the riser card and is operatively interconnected between the 1394 host controller and the plurality of 1394 ports carried on the riser card.

The previously mentioned riser card connector socket mounted on the motherboard is preferably identical to he connector socket mounted on the riser card in a standard NLX form factor motherboard/riser card assembly and adapter to horizontally receive a corresponding connector edge portion of the motherboard. By mounting the single PHY on the riser card, connector socket pin count limitations are advantageously avoided, and multiple device bays are supported by the assembly with a single PHY and without the need for a USB device bay controller.

In one embodiment of the motherboard/riser card assembly, the 1394 host controller is carried on the riser card along with the single PHY, and the assembly is provided with a 1394 port carried on the first edge portion of the motherboard. This 1394 port is coupled to the PHY on the riser card by a lead extending along the motherboard and the riser card and having a portion formed by a section of the mated riser card connector card and riser card connector edge portion.

In another embodiment of the motherboard/riser card assembly, the 1394 host controller is carried on the motherboard, and the riser card has an auxiliary connector edge portion removably received in an auxiliary socket connector on the motherboard. The 1394 host controller is coupled to the PHY by a lead extending along the motherboard and the riser card and having a portion defined by a section of the mated auxiliary connector socket and riser card connector edge portion.

This second motherboard/riser card assembly embodiment also has a 1394 port carried on the first edge portion of the motherboard and coupled to the PHY by a lead extending along the motherboard and the riser card and having a portion formed by a section of the mated primary riser board connector socket and riser card connector edge portion.

DETAILED DESCRIPTION

Figure 1:
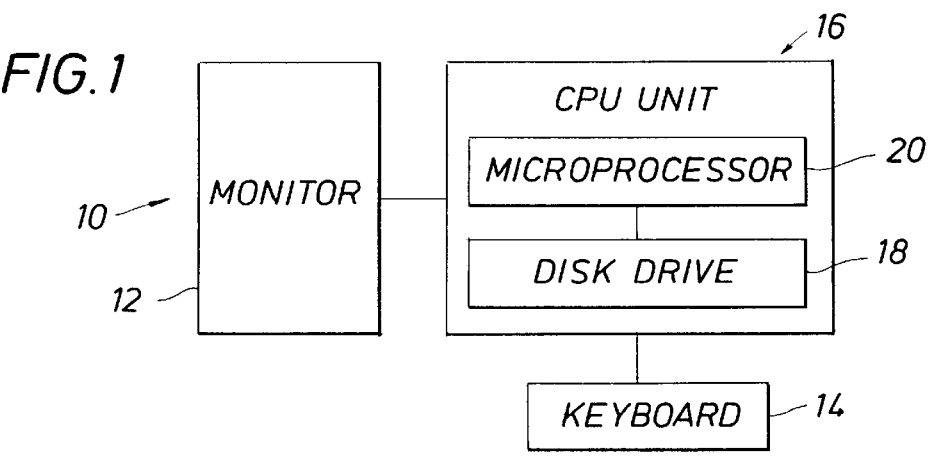
FIG. 1 is a schematic diagram of a computer system having a CPU unit in which a specially designed motherboard and riser card assembly embodying principles of the present invention is incorporated.

As schematically depicted in FIG. 1, the present invention provides electronic apparatus that is representatively in the form of a computer system 10 comprising a monitor 12 and keyboard 14 operatively coupled to a CPU unit 16. In addition to various other components, the CPU unit 16 (also commonly referred to simply as a "computer") has a data storage device therein, representatively a disk drive 18, for storing data that may be retrieved by a microprocessor 20 within the CPU unit 16. Representatively, the CPU unit 16 is a desktop computer.

Figure 2A:
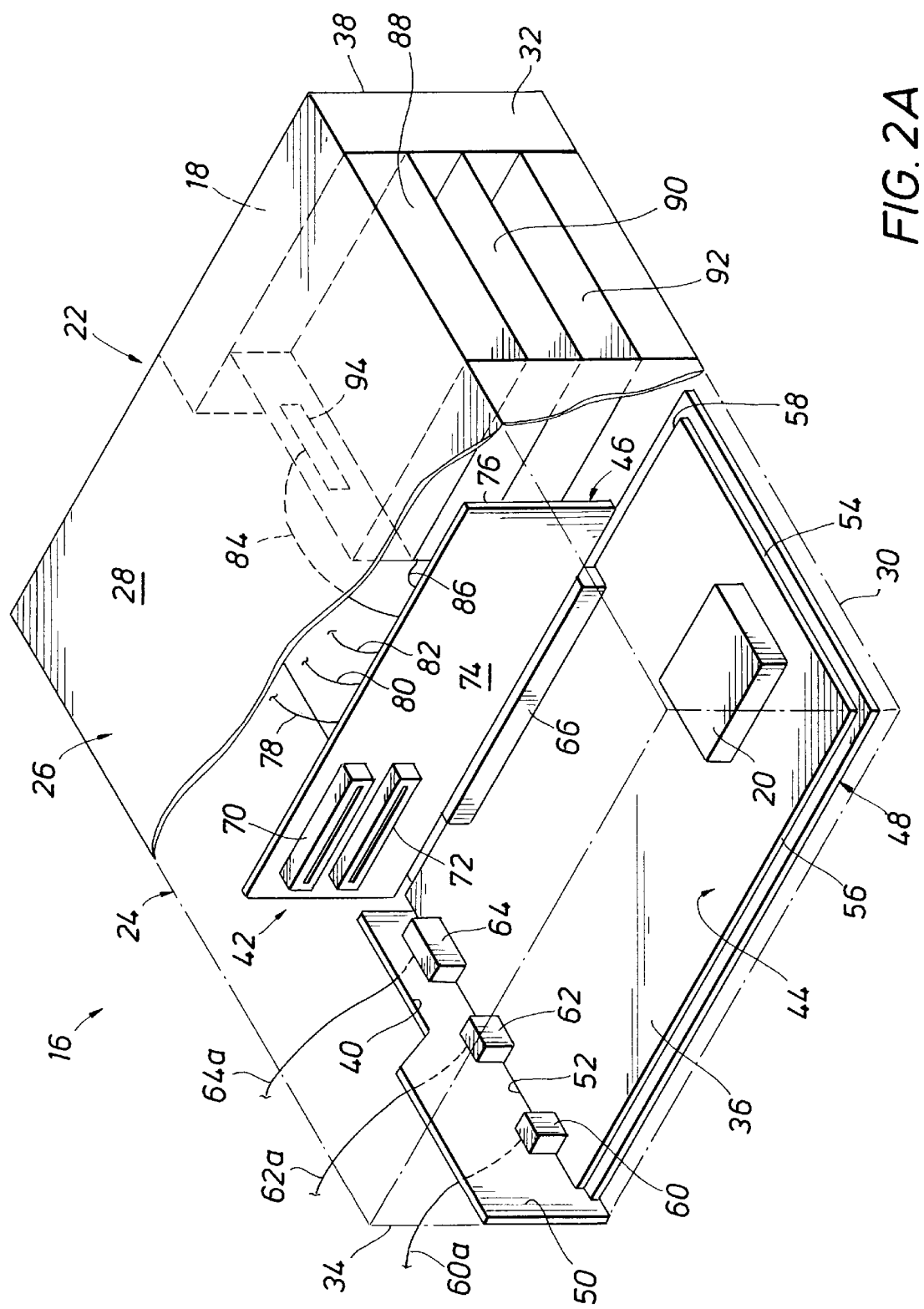
FIG. 2A is a partially phantomed schematic perspective view of the CPU unit illustrating the motherboard/riser card assembly operatively disposed therein.

Referring now to FIG. 2A, the CPU unit 16 includes a generally rectangular hollow housing structure 22 formed by a hollow inner sheet metal chassis 24 disposed within a removable outer housing portion 26 which representatively has an open bottom side. In its assembled form, the housing structure 22 has a top side 28, a bottom side 30 defined by the bottom side wall of the chassis 24, opposite upstanding front and rear sides 32 and 34, and opposite upstanding left and right ends 36 and 38. For purposes later described herein, the rear side 34 has an opening 40 formed therein.

According to a key aspect of the present invention, a specially designed motherboard/riser card assembly 42 is operatively disposed within the interior of the housing structure 22 along with other internal computer components such as the disk drive 18 which is representatively positioned within a right front corner portion of the housing structure 22. Assembly 42 includes a horizontally oriented motherboard 44, and a vertically oriented riser card 46. The assembly 42 is shown in highly simplified form, with various of its electronic components having been deleted for purposes of illustrative clarity. Similar simplifying deletions have also been made in the balance of the housing interior.

The previously mentioned microprocessor 20 is disposed on a top side portion of the motherboard 44 and is operatively linked to the disk drive 18 so that data stored in the disk drive 18 may be selectively retrieved by the microprocessor 20. Motherboard 44 is suitably secured to the top side of a support tray 48 having an upstanding rear end wall 50 complementarily received in the housing structure rear side opening 40. Tray 48 is slidably carried on the bottom chassis wall 30 for forward and rearward movement relative thereto, as later described herein, into and out of the housing interior to permit convenient removal and reinsertion of the motherboard 44 respectively from and back into the housing structure 22. In FIG. 2A, the tray 48 and motherboard 44 are shown in their fully inserted positions within the housing interior.

Still referring to FIG. 2A, the rectangular motherboard body has a rear end edge 52 positioned inwardly adjacent the rear tray end wall 50, a front end edge 54, and opposite left and right side edges 56,58 extending between the rear and front end edges 52,54. I/0 connectors 60,62,64 are secured to the top side of the motherboard 44, adjacent its rear end edge 52, are aligned with corresponding openings in the rear tray end wall 50, and are removably connected to corresponding I/O cables 60a,62a,64a extending inwardly through the tray end wall openings. An elongated rectangular riser card connector socket 66 is secured to the top side of the motherboard 44 and longitudinally extends parallel to its side edges 54 and 56. Preferably, as illustrated in FIG. 2A, the connector socket 66 is positioned closely adjacent the right motherboard side edge 58 generally centrally along its length.

Figure 2B:
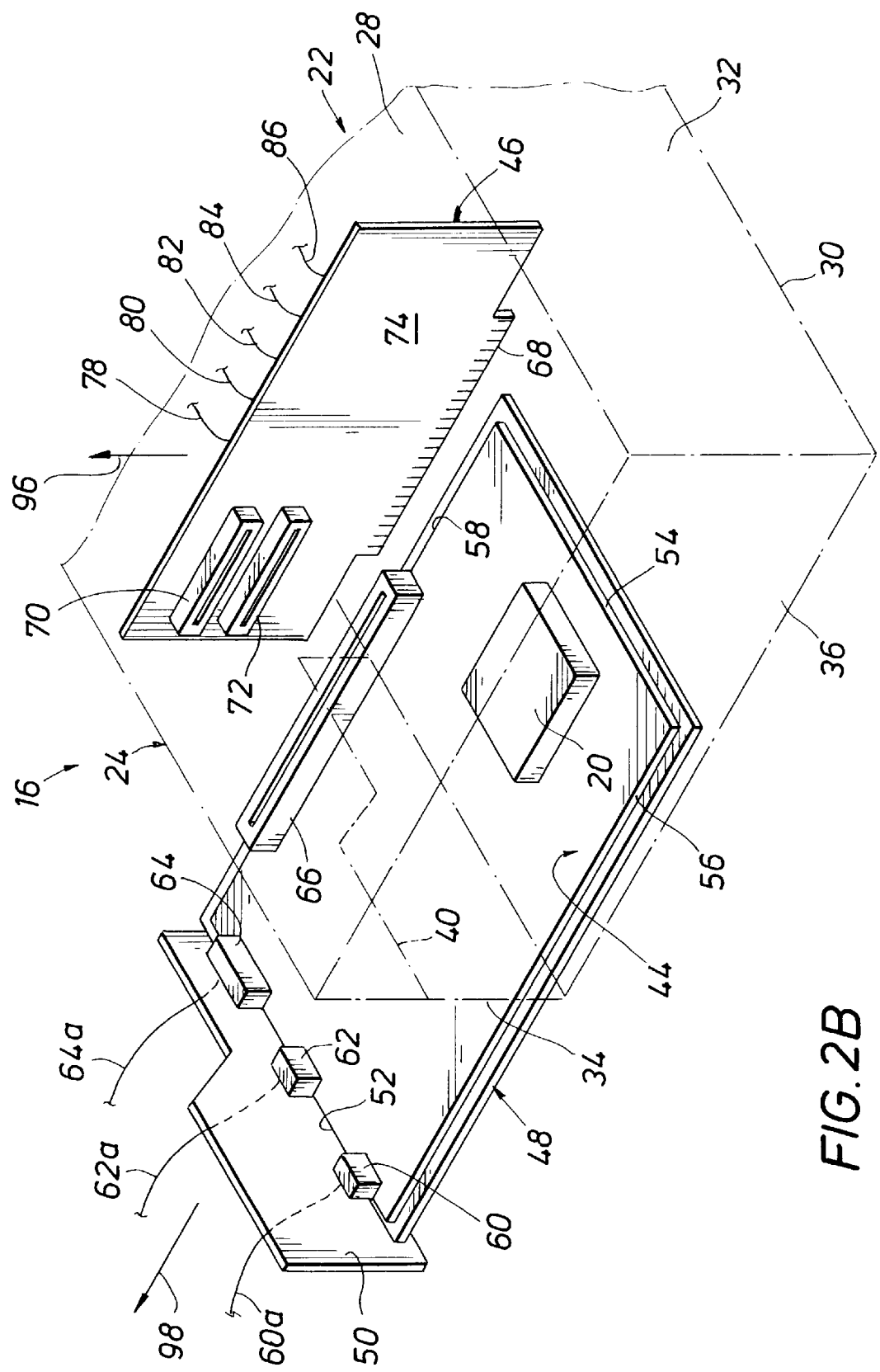
FIG. 2B is a view similar to that in FIG. 2A, but illustrating the simple manner in which the motherboard may be removed from the CPU unit or servicing or upgrading.

Turning now to FIGS. 2A and 2B, the vertically oriented riser card 46 has a bottom side edge connector portion 68 (see FIG. 2B) which is removably inserted downwardly into the connector socket 66 to electrically couple the circuitry and components on the riser card 46 to the circuitry and components on the motherboard 44. Preferably, the connector socket 66 is substantially identical to the riser card connector socket provided on a standard NLX form factor motherboard/riser card assembly and has, for example, an identical pin placement and count.

In addition to other components and circuitry omitted in FIGS. 2A and 2B for purposes of illustrative clarity, a plurality (representatively two in number) of expansion slots 70,72 are mounted on the front side 74 of the riser card 46 to provide for a plug-in connection of corresponding expansion cards (not shown). On the back side 76 of the riser card 46 are a plurality of connectors (not visible in FIGS. 2A and 2B) to which ends of various cables, for example the representatively illustrated cables 78–86, are removably connected. The opposite ends of these cables are secured to various internal components of the CPU unit 16.

Such internal components include three vertically stacked device bays 88,90 and 92, the upper two of which are connected to the riser card 46 respectively by the internal component cables 84 and 86 that are secured to connectors (such as the illustrated connector 94) positioned on the rear or inner vertical walls of the device bays. The preferred placement of the motherboard connector socket 66 closely adjacent the motherboard side edge 58 advantageously reduces the necessary lengths of the connector cables 78–86. Each device bay has an open front end through which a modular device (such as a CD ROM drive, a floppy drive, a hard drive or the like) may be rearwardly inserted into the bay, the modular device (not shown) having on its rear side a connector which mates with the device bay rear wall connector to link the inserted modular device to the riser card 46 (and thus the motherboard 44) via the corresponding device bay cable plugged into the riser card 46.

According to a key aspect of the present invention, all of the internal device cables are run not to the motherboard 44, but instead to the riser card 46. Thus, with the exception of the previously mentioned I/O cables 60a,62a and 64a, there are no cables connected directly to the motherboard 44. Coupled with the positioning of the riser card connector socket 66 on the top side of the motherboard 44 and the mounting of the motherboard 44 on the sliding support tray 48, this greatly facilitates the removal of the motherboard 44 from the housing structure 22 for servicing or upgrading purposes.

Specifically, by utilizing the specially configured motherboard/riser card assembly 42 of the present invention, all that is necessary to remove the motherboard 44 is to (1) remove the outer housing portion 28 to provide top access to the riser card 46, (2) upwardly unseat the riser card 46 from the motherboard connector socket 66 as indicated by the arrow 96 in FIG. 2B, and then (3) pull the tray 48 rearwardly out of the chassis 24 as indicated by the arrow 98 in FIG. 2A. Importantly, to gain access to the motherboard 44 in this manner it is not necessary to disconnect any cable from either the motherboard 44 of the riser card 46 due to the unique configuration and arrangement of the motherboard/riser card assembly 42 of the present invention. As can readily be seen, this provides the assembly 42 with a distinct serviceability advantage over either of the industry standard LPX and NLX motherboard/riser card form factors.

In addition to the enhanced serviceability of the motherboard/riser card assembly 42 of the present invention compared to the industry standard LPX and NLX motherboard/riser card form factors, the assembly 42 also is substantially more suitable for the support of multiple device bays (such as the schematically illustrated bays 88,90 and 92 in FIG. 2A) due to a unique design aspect thereof which will now be described in conjunction with FIG. 3.

As previously mentioned herein, neither of the industry standard LPX and NLX motherboard/riser card form factors is particularly well suited for the support of multiple device bays. The LPX form factor is not a good choice for this task due to the necessity of cabling each device bay to the motherboard, thereby requiring that still further cabling be disconnected from the motherboard before it can be removed from the chassis for servicing, upgrading and the like.

The NLX form factor, in which a single 1394 PHY and host controller are incorporated on the motherboard, has support for a single 1394 port (to which a single device bay may be cabled). Therefore, utilizing the NLX form factor, a two device bay system would require a second 1394 PHY to expand that single port to two (or more) ports. In that scenario, according to the Device Bay specification, a USB device bay controller (DBC) must be used. Because of this requirement, a multi-device bay system in which the NLX form factor is utilized incurs a substantial cost penalty due to the second PHY and a more complex (and therefore more expensive) device bay controller.

Figure 3:
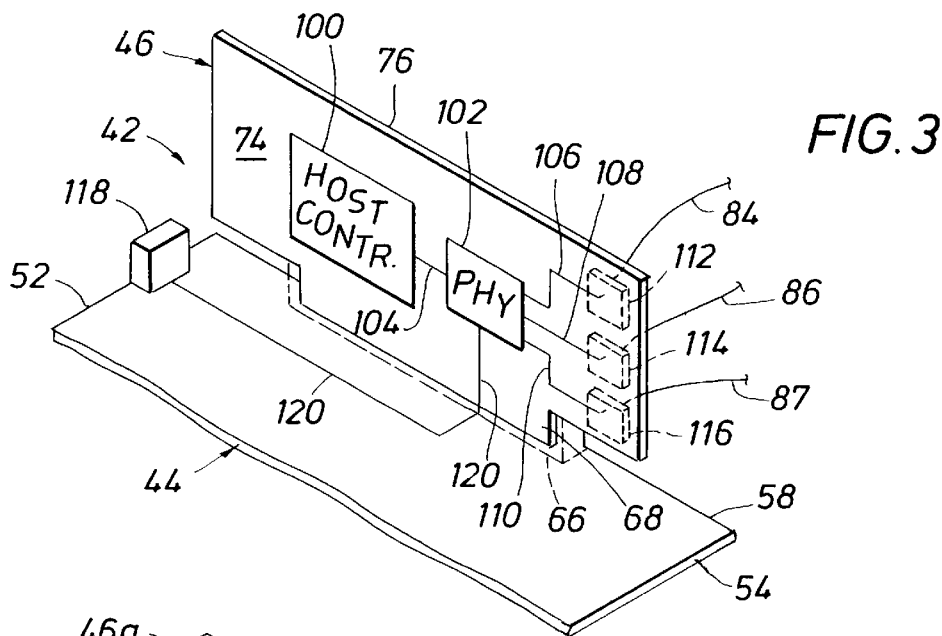
FIG. 3 is a schematic perspective view of a portion of the motherboard/riser card assembly illustrating in simplified form a portion of its unique device bay circuitry.

In the motherboard/riser card assembly 42 of the present invention, as schematically illustrated in FIG. 3, this additional expense of supporting more than one device bay is uniquely eliminated by placing a single 1394 host controller 100 and associated host controller PHY bus driver 102 on the riser card 46. PHY 102 is linked to the host controller 100 by a lead 104, and is further linked, by leads 106,108, and 110, to 1394 connector ports 112,114 and 116 disposed on the riser card 46. Ports 112,114 and 116 are, in turn, electrically coupled to the device bays 88,90 and 92 (see FIG. 2A) respectively by cables 84,86 and 87. PHY 102 is further coupled to a 1394 connector port 118, disposed on the motherboard 44 at its rear end edge 52, by a lead 120 having a portion thereof defined by a section of the connector socket/card edge interface 66,68.

As previously mentioned, the socket connector 66 disposed on the motherboard 44 at its side edge 58 is identical to the riser card connector socket provided in a standard NLX form factor motherboard/riser card assembly, having the same pin placement and count and providing support for only one PHY/link interface (i.e., a connection between a PHY and an associated 1394 port). In the present invention, however, this connector pin limitation is uniquely avoided by placing the single PHY 102 on the riser card 46. In this manner, a plurality of 1394 ports (for example the ports 106–112 shown in FIG. 3) are useable without the previous costly necessity of providing multiple PHY's and a USB device bay controller.

Figure 4:
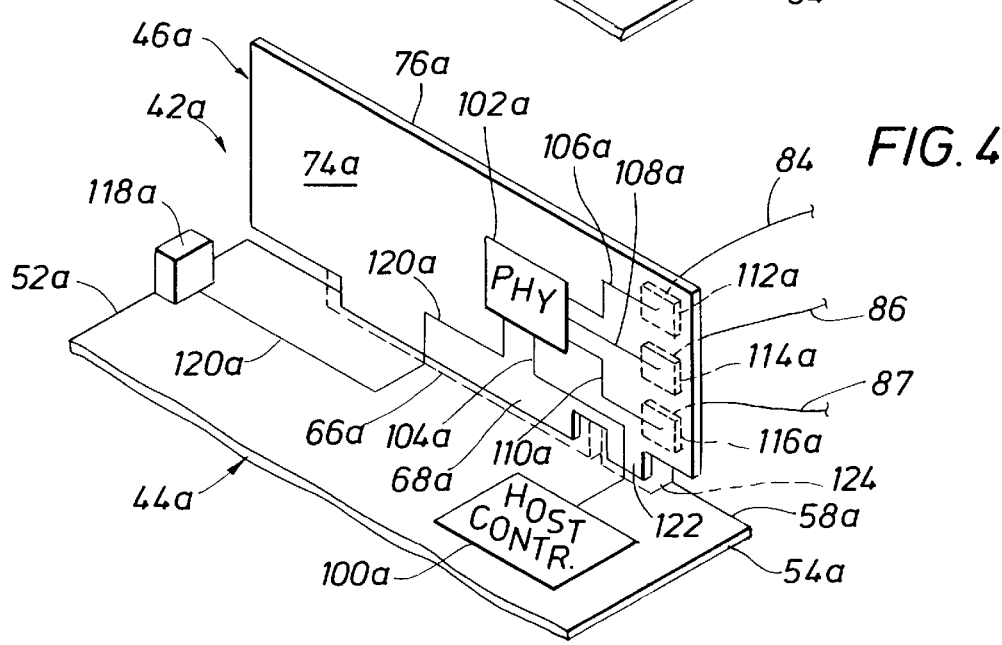
FIG. 4 is a schematic perspective view of a portion of an alternate embodiment of the motherboard/riser card assembly shown in FIG. 3.

An alternate embodiment 42a of the previously described motherboard/riser card assembly 42 is schematically depicted in FIG. 4, with the components in the assembly 42a similar to those in assembly 42 being given identical reference numerals with subscripts "a" for ready comparison to their counterpart components in assembly 42.

Assembly 42a is identical to assembly 40 with the exceptions that (1) in the assembly 42a a supplemental bottom edge connector portion 122 is formed on the riser card 46a and is removably received in a supplemental connector socket 124 disposed on the top side of the motherboard 44a adjacent the connector socket 66a, and (2) the host controller 100a is relocated onto the motherboard 44a and coupled to the PHY 102a on the riser card 46a by a lead 104a having a portion thereof defined by a section of the connector/card edge interface 122,124. This modification of the previously described motherboard/riser card assembly 42 conveniently permits the placement of the 1394 host controller on the motherboard, in applications where it is desirable to do so, while still permitting the assembly 42a to support multiple device bays with a single PHY device uniquely positioned on the riser card 46a. In each embodiment of the motherboard/riser card assembly shown in FIGS. 3 and 4, of course, the motherboard may (as previously described in conjunction with FIGS. 2A and 2B) be quickly and easily removed from the computer chassis 24 without disconnecting any cables from the motherboard.

The foregoing detailed description is to be clearly understood as being given by way of illustration and example only, the spirit and scope of the present invention being limited solely by the appended claims.

What is claimed is:

1. Computer apparatus comprising:
    a chassis having an outer side portion with an opening therein;
    a motherboard supported within said chassis for movement relative thereto into and out of said opening, said motherboard having a first edge portion positioned adjacent said opening for movement outwardly therethrough;
    at least one I/O connector carried on said first edge portion and to which an I/O cable external to said chassis may be secured;
    a riser card connector socket mounted on said motherboard; and
    a riser card having a connector edge portion removably received in said riser card connector socket, said riser card having at least one cable connector thereon which is electrically coupled to said motherboard and to which an internal computer component cable may be secured,
    said I/O and riser card cable connectors forming, for apparatus external to said motherboard, the sole cable connection locations for said motherboard, whereby said motherboard may be accessed, without having to first disconnect any cables therefrom, by uncoupling said riser card from said riser card connector socket and then moving said motherboard outwardly through said chassis opening.

2. The computer apparatus of claim 1 wherein:
    said computer apparatus is a desktop computer.

3. The computer apparatus of claim 1 wherein:
    said motherboard has a second edge portion extending transversely to said first edge portion, and
    said riser card connector socket is disposed on said second edge portion.

4. The computer apparatus of claim 1 wherein:
    said riser card is transverse to said motherboard and removable from said riser card connector socket in a direction transverse to said motherboard.

5. The computer apparatus of claim 1 wherein:
    said outer side portion of said chassis is a rear outer side portion thereof.

6. The computer apparatus of claim 1 further comprising:
    a plurality of device bays disposed within said chassis and having connectors thereon, a plurality of ports carried on said riser card and being operatively connectable to said device bay connectors, a host controller carried on one of said motherboard and said riser card, and a single host controller bus driver carried on said riser card and operatively interconnected between said host controller and said plurality of ports.

7. The computer apparatus of claim 6 wherein:

said host controller is carried on said riser card.

8. The computer apparatus of claim 7 further comprising:

a port carried on said motherboard and coupled to said host controller bus driver by a lead extending along said motherboard and said riser card and having a portion formed by a section of the mated riser card connector socket and riser card connector edge portion.

9. The computer apparatus of claim 8 wherein:

said port carried on said motherboard is positioned on said first edge portion of said motherboard.

10. The computer apparatus of claim 6 wherein:

said host controller is carried on said motherboard, said motherboard has a second riser card connector socket mounted thereon, said riser card has a second connector edge portion removably received in said second riser card connector socket, and said host controller is coupled to said host controller bus driver by a lead extending along said motherboard and said riser card and having a portion defined by a section of the mated second riser card connector socket and riser card connector edge portion.

11. The computer apparatus of claim 10 further comprising:

a port carried on said motherboard and coupled to said host controller bus driver by a lead extending along said motherboard and said riser card and having a portion formed by a section of the mated first-mentioned riser card connector socket and first-mentioned riser card connector edge portion.

12. The computer apparatus of claim 11 wherein:

said port carried on said motherboard is positioned on said first edge portion of said motherboard.

13. A computer system comprising a CPU unit having a microprocessor, and a data storage device for storing data that may be retrieved by said microprocessor, said CPU unit including:

a chassis having an outer side portion with an opening therein;

a motherboard supported within said chassis for movement relative thereto into and out of said opening, said motherboard having a first edge portion positioned adjacent said opening for movement outwardly therethrough;

at least one I/O connector carried on said first edge portion and to which an I/O cable external to said chassis may be secured;

a riser card connector socket mounted on said motherboard; and a riser card having a connector edge portion removably received in said riser card connector socket, said riser card having at least one cable connector thereon which is electrically coupled to said motherboard and to which an internal computer component cable may be secured, said I/O and riser card cable connectors forming, for apparatus external to said motherboard, the sole cable connection locations for said motherboard, whereby said motherboard may be accessed, without having to first disconnect any cables therefrom, by uncoupling said riser card from said riser card connector socket and then moving said motherboard outwardly through said chassis opening.

14. The computer system of claim 13 wherein:

said CPU unit is a desktop computer.

15. The computer system of claim 13 wherein:

said motherboard has a second edge portion extending transversely to said first edge portion, and said riser card connector socket is disposed on said second edge portion.

16. The computer system of claim 13 wherein:

said riser card is transverse to said motherboard and removable from said riser card connector socket in a direction transverse to said motherboard.

17. The computer system of claim 13 wherein:

said outer side portion of said chassis is a rear outer side portion thereof.

18. The computer system of claim 13 further comprising:

a plurality of device bays disposed within said chassis and having connectors thereon, a plurality of ports carried on said riser card and being operatively connectable to said device bay connectors, a host controller carried on one of said motherboard and said riser card, and a single host controller bus driver carried on said riser card and operatively interconnected between said host controller and said plurality of ports.

19. The computer system of claim 18 wherein:

said host controller is carried on said riser card.

20. The computer system of claim 19 further comprising:

a port carried on said motherboard and coupled to said host controller bus driver by a lead extending along said motherboard and said riser card and having a portion formed by a section of the mated riser card connector socket and riser card connector edge portion.

21. The computer system apparatus of claim 20 wherein:

said port carried on said motherboard is positioned on said first edge portion of said motherboard.

22. The computer system of claim 18 wherein:

said host controller is carried on said motherboard, said motherboard has a second riser card connector socket mounted thereon, said riser card has a second connector edge portion removably received in said second riser card connector socket, and said host controller is coupled to said host controller bus driver by a lead extending along said motherboard and said riser card and having a portion defined by a section of the mated second riser card connector socket and second riser card connector edge portion.

23. The computer system of claim 22 further comprising:

a port carried on said motherboard and coupled to said host controller bus driver by a lead extending along said motherboard and said riser card and having a portion formed by a section of the mated first-mentioned riser card connector socket and first-mentioned riser card connector edge portion.

24. The computer system of claim 23 wherein:

said port carried on said motherboard is positioned on said first edge portion of said motherboard.

25. A motherboard/riser card assembly for a computer, comprising:

a motherboard having a first edge portion;

an I/O cable connector carried on said first edge portion;

a riser card connector socket carried on said motherboard;

a riser card having a connector edge portion removably received in said riser card connector socket, said riser card being transverse to said motherboard and being removable from said motherboard in a direction transverse thereto;

a plurality of ports carried on said riser card;

a host controller carried on one of said motherboard and said riser card; and a single host controller bus driver carried on said riser card and operatively Interconnecting said host controller and said plurality of ports, the positioning of said single host controller bus driver on said riser card permitting said plurality of ports to be utilized in said motherboard/riser card assembly without an additional host controller bus driver being used in conjunction with said plurality of ports.

26. The motherboard/riser card assembly of claim 25 wherein:

said motherboard has a second edge portion extending transversely to said first edge portion, and said riser card connector socket is carried on said second edge portion.

27. The motherboard/riser card assembly of claim 25 wherein:

said host controller is carried on said riser card.

28. The motherboard/riser card assembly of claim 27 further comprising:

a port carried on said motherboard and coupled to said host controller bus driver by a lead extending along said motherboard and said riser card and having a portion formed by a section of the mated riser card connector socket and riser card connector edge portion.

29. The motherboard/riser card assembly of claim 28 wherein:

said port carried on said motherboard is positioned adjacent said first edge portion of said motherboard.

30. The motherboard/riser card assembly of claim 25 wherein:

said host controller is carried on said motherboard, said motherboard has a second riser card connector socket mounted thereon, said riser card has a second connector edge portion removably received in said second riser card connector socket, and said host controller is coupled to said host controller bus driver by a lead extending along said motherboard and said riser card and having a portion defined by a section of the mated second riser card connector socket and second riser card connector edge portion.

31. The motherboard/riser card assembly of claim 30 further comprising:

a port carried on said motherboard and coupled to said host controller bus driver by a lead extending along said motherboard and said riser card and having a portion formed by a section of the mated first-mentioned riser card connector socket and first-mentioned riser card connector edge portion.

32. The motherboard/riser card assembly of claim 31 wherein:

said port carried on said motherboard is positioned on said first edge portion of said motherboard.

* * * * *